(12) United States Patent
Kirshenbaum et al.

(10) Patent No.: US 7,593,904 B1
(45) Date of Patent: Sep. 22, 2009

(54) EFFECTING ACTION TO ADDRESS AN ISSUE ASSOCIATED WITH A CATEGORY BASED ON INFORMATION THAT ENABLES RANKING OF CATEGORIES

(75) Inventors: Evan R. Kirshenbaum, Mountain View, CA (US); Henri J. Suermondt, Sunnyvale, CA (US); George H. Forman, Port Orchard, WA (US); Thomas M. Tripp, El Dorado Hills, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 831 days.

(21) Appl. No.: 11/172,187

(22) Filed: Jun. 30, 2005

(51) Int. Cl.
*G06F 15/18* (2006.01)
(52) U.S. Cl. .......................................... 706/12; 706/20
(58) Field of Classification Search ..................... 706/12
See application file for complete search history.

(56) References Cited

U.S. PATENT DOCUMENTS

| | | | |
|---|---|---|---|
| 5,819,258 A | 10/1998 | Vaithyanathan et al. | |
| 5,903,884 A | 5/1999 | Lyon et al. | |
| 5,943,670 A | 8/1999 | Prager | |
| 6,003,027 A | 12/1999 | Prager | |
| 6,038,560 A | 3/2000 | Wical | |
| 6,418,434 B1 * | 7/2002 | Johnson et al. | 707/5 |
| 6,446,061 B1 * | 9/2002 | Doerre et al. | 707/3 |
| 6,621,930 B1 * | 9/2003 | Smadja | 382/224 |
| 6,675,161 B1 | 1/2004 | Suchter | |
| 6,701,333 B2 | 3/2004 | Suermondt et al. | |
| 6,704,905 B2 | 3/2004 | Fukushige et al. | |
| 6,728,690 B1 | 4/2004 | Meek et al. | |
| 6,823,323 B2 | 11/2004 | Forman et al. | |
| 6,842,751 B1 | 1/2005 | Vilalta et al. | |
| 6,925,454 B2 * | 8/2005 | Lam et al. | 706/45 |
| 6,944,616 B2 | 9/2005 | Ferguson et al. | |
| 6,947,936 B1 * | 9/2005 | Suermondt et al. | 707/7 |
| 6,973,452 B2 | 12/2005 | Metzger et al. | |
| 6,990,485 B2 * | 1/2006 | Forman et al. | 707/5 |
| 7,043,492 B1 | 5/2006 | Neal et al. | |
| 7,051,009 B2 | 5/2006 | Suermondt et al. | |
| 7,113,957 B1 | 9/2006 | Cohen et al. | |

(Continued)

FOREIGN PATENT DOCUMENTS

EP 0747848 A2 12/1996

OTHER PUBLICATIONS

Effect of Overlapping Projections on Reconstruction Image Quality in Multipinhole SPECT Vunckx, K.; Suetens, P.; Nuyts, J.; Medical Imaging, IEEE Transactions on vol. 27, Issue 7, Jul. 2008 pp. 972-983 Digital Object Identifier 10.1109/TMI.2008.922700.*

(Continued)

*Primary Examiner*—Michael B Holmes

(57) ABSTRACT

A categorizer is trained for plural categories according to a machine-learning algorithm. The categorizer classifies cases in a set of cases into the plural categories. One or more quantification measures regarding cases in the data set are computed based on output from the categorizer, and information is provided to enable ranking of the categories based on the one or more quantification measures. Action is effected to address an issue associated with at least one of the categories based on the provided information.

45 Claims, 8 Drawing Sheets

U.S. PATENT DOCUMENTS

| | | | |
|---|---|---|---|
| 7,177,855 | B2 | 2/2007 | Witkowski et al. |
| 7,184,602 | B2 | 2/2007 | Cohen et al. |
| 7,200,606 | B2 | 4/2007 | Elkan |
| 7,302,426 | B2 * | 11/2007 | Bier ............................... 707/3 |
| 7,325,005 | B2 | 1/2008 | Forman et al. |
| 7,349,917 | B2 * | 3/2008 | Forman et al. .............. 707/102 |
| 7,409,404 | B2 * | 8/2008 | Gates ......................... 707/102 |
| 7,437,338 | B1 * | 10/2008 | Forman et al. ................ 706/20 |
| 2005/0096866 | A1 | 5/2005 | Shan et al. |
| 2006/0173559 | A1 | 8/2006 | Kirshenbaum et al. |
| 2007/0185901 | A1 | 8/2007 | Gates |

OTHER PUBLICATIONS

Effects of Overlapping Projections on Reconstruction Image Quality in Multipinhole SPECT Vunckx, K; Nuyts, J.; Nuclear Science Symposium Conference Record, 2006. IEEE vol. 5, Oct. 29, 2006-Nov. 1, 2006 pp. 2826-2833 Digital Object Identifier 10.1109/NSSMIC.2006.356466.*

Segmentation and Quantification of Blood Vessels in 3D Images using a Right Generalized Cylinder State Model Florez-Valencia, L.; Azencot, J.; Vincent, F.; Orkisz, M.; Magnin, I.E.; Image Processing, 2006 IEEE International Conference on Oct. 8-11, 2006 pp. 2441-2444 Digital Object Identifier 10.1109/ICIP.2006.312770.*

On feature selection in a class of distribution-free pattern classifiers Wee, W.; Information Theory, IEEE Transaction on vol. 16, Issue 1, Jan. 1970 pp. 47-55.*

TV Commercial Classification by using Multi-Modal Textual Information Zheng, Y.; Duan, L.; Tian, Q.; Jin, J.S.; Multimedia and Expo, 2006 IEEE International Conference on Jul. 9-12, 2006 pp. 497-500 Digital Object Identifier 10.1109/ICME.2006.262434.*

An Autonomous Reading Machine Casey, R.G.; Nagy, G.; Computers, IEEE Transactions on vol. C-17, Issue 5, May 1968 pp. 492-503.*

Self-corrective character recognition system Nagy, G.; Shelton, G.; Jr.; Information Theory, IEEE Transactions on vol. 12, Issue 2, Apr. 1966, pp. 215-222.*

Forman et al, U.S. Appl. No. 11/080,098, entitled "A Method of, and System for, Classification Count Adjustment," filed Mar. 14, 2005, pp. 1-31, Figs. 1A-5.

Kirshenbaum et al., U.S. Appl. No. 11/118,178, entitled "Providing Training Information for Training a Categorizer," filed Apr. 29, 2005, pp. 1-39, Figs. 1-3E.

Kirshenbaum et al., U.S. Appl. No. 11/118,786, entitled "Computing a Quantification Measure Associated With Cases in a Category," filed Apr. 29, 2005, pp. 1-35, Figs. 1-3D.

Kirshenbaum et al., U.S. Appl. No. 11/211,979, entitled "Producing a Measure Regarding Cases Associated with an Issue After One or More Events Have Occurred," filed Aug. 25, 2005, pp. 1-51, Figs. 1-5H.

Forman et al., U.S. Appl. No. 11/364,108, entitled "Identifying an Emerging or New Category," filed Feb. 28, 2006, pp. 1-34, Figs. 1-6.

Forman et al., U.S. Appl. No. 11/393,487, entitled "Comparing Distributions of Cases Over Groups of Categories," filed Mar. 30, 2006, pp. 1-39, Figs. 1-7E.

Shan, U.S. Appl. No. 11/117,989, entitled "Performing Quality Determination of Data," filed Apr. 29, 2005, pp. 1-32, Figs. 1-9.

Shan, U.S. Appl. No. 11/118,832, entitled "Determining a Time Point Corresponding to a Change in Data Values Based on Fitting with Respect to Plural Aggregate Value Sets," filed Apr. 29, 2005, pp. 1-26, Figs. 1-8.

Shan, U.S. Appl. No. 11/119,037, entitled "Detecting Change in Data," filed Apr. 29, 2005, pp. 1-26, Figs. 1-6.

Office Action of Jun. 2, 2008 in U.S. Appl. No. 11/118,178.

Office Action of Oct. 16, 2007 in U.S. Appl. No. 11/118,178.

Office Action of Sep. 18, 2007 in U.S. Appl. No. 11/118,786.

Office Action of Jan. 17, 2008 in U.S. Appl. No. 11/386,005, now U.S. Patent No. 7,437,338.

Final Rejection dated Apr. 18, 2008 in U.S. Appl. No. 11/118,786.

U.S. Appl. No. 11/118,178, Final Rejection dated Dec. 12, 2008, pp. 1-23 and attachments.

* cited by examiner

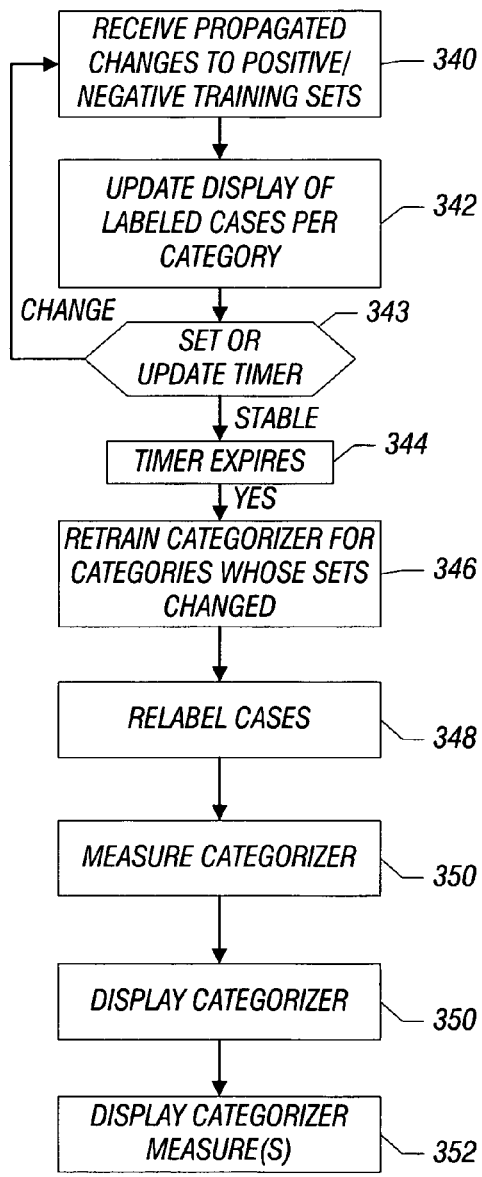
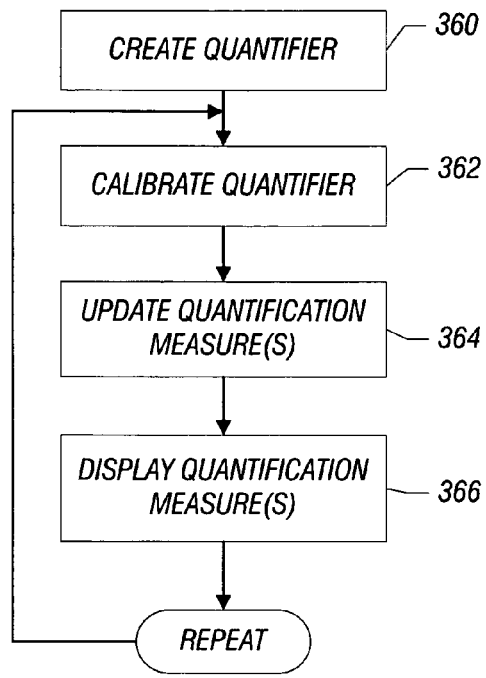
FIG. 5D
FIG. 5E

EFFECTING ACTION TO ADDRESS AN ISSUE ASSOCIATED WITH A CATEGORY BASED ON INFORMATION THAT ENABLES RANKING OF CATEGORIES

BACKGROUND

In a typical customer support organization (e.g., call center, service desk, electronic support center, and so forth) of a large organization (e.g., a business organization, an educational organization, or a government organization), tens to hundreds of thousands of calls may be received monthly from customers regarding various issues. Based on the calls received, the customer support organization typically attempts to identify problems that may exist in products or services. In response to these problems, the customer support organization may attempt to solve the problems, such as by improving documentation and various search tools used by technicians at the customer support organization. Additionally, the customer support organization can provide documentation on web portals to enable customers to solve problems on their own.

Conventionally, procedures and mechanisms have not been provided to efficiently and accurately identify issues that are associated with the calls received by the customer support organization. Also, procedures and mechanisms have also not been provided for efficiently and accurately quantifying received calls by a customer support organization broken down by different types of issues to enable the customer support organization to quickly determine which issues have higher priority and thus should first be addressed. Without the ability to efficiently and accurately identify and quantify issues, a customer support organization may waste resources trying to address an issue that should have lower priority than other issues.

Most calls received by customer support organizations are documented based on summaries entered by the customer call agents that received the calls. Some customer support organizations ask call agents to label each call from a menu of choices, also referred to as "issue paths." Such labeling of calls performed by call agents is usually not accurate, since call agents are typically under time pressure to resolve a call as quickly as possible. Moreover, call agents may not be properly trained to classify a call to all the possible categories. In addition, as new categories are added, the training involved to re-train call agents to recognize the new categories can involve substantial costs. If not trained properly, call agents tend to bias classifying of calls to the top of a list, toward a catch-all "other" category, or toward overly general categories (such as a "hardware" or "software" category) without specificity. Also, if the list of categories is not complete, then the classification performed by the call agents would be incomplete. Also, the available categories in the list may not accurately describe a particular call.

Another technique of categorizing calls is based on using an expert off-line to look at information pertaining to the calls or a sample of the calls. The expert would then attempt to label the calls into various issue categories. Using an expert, or plural experts, to label calls received by a customer support organization can be time-consuming, labor-intensive, and expensive. Moreover, experts may be familiar with certain issues, while not very familiar with other issues. As a result, classification performed by such experts may be biased toward certain categories, resulting in somewhat inaccurate categorizations.

Another approach is to survey customers, in which customers are asked to fill out customer surveys or to answer questions. This process is relatively intrusive, and many customers may not be willing to participate in the survey. Moreover, the information collected from customers may be incomplete, as the customers may not be properly motivated to enter all information, or the customers may interpret different questions differently, and thus provide differing answers based on the different interpretations.

As a result of unreliable or inefficient classification of calls using conventional techniques, organizations have been unable to reliably or efficiently prioritize problems to better focus the resources of the organizations.

BRIEF DESCRIPTION OF THE DRAWINGS

Some embodiments of the invention are described with reference to the following figures:

FIGS. 5A-5H are flow diagrams of processes performed by the analysis tool according to an embodiment.

DETAILED DESCRIPTION

Figure 1:
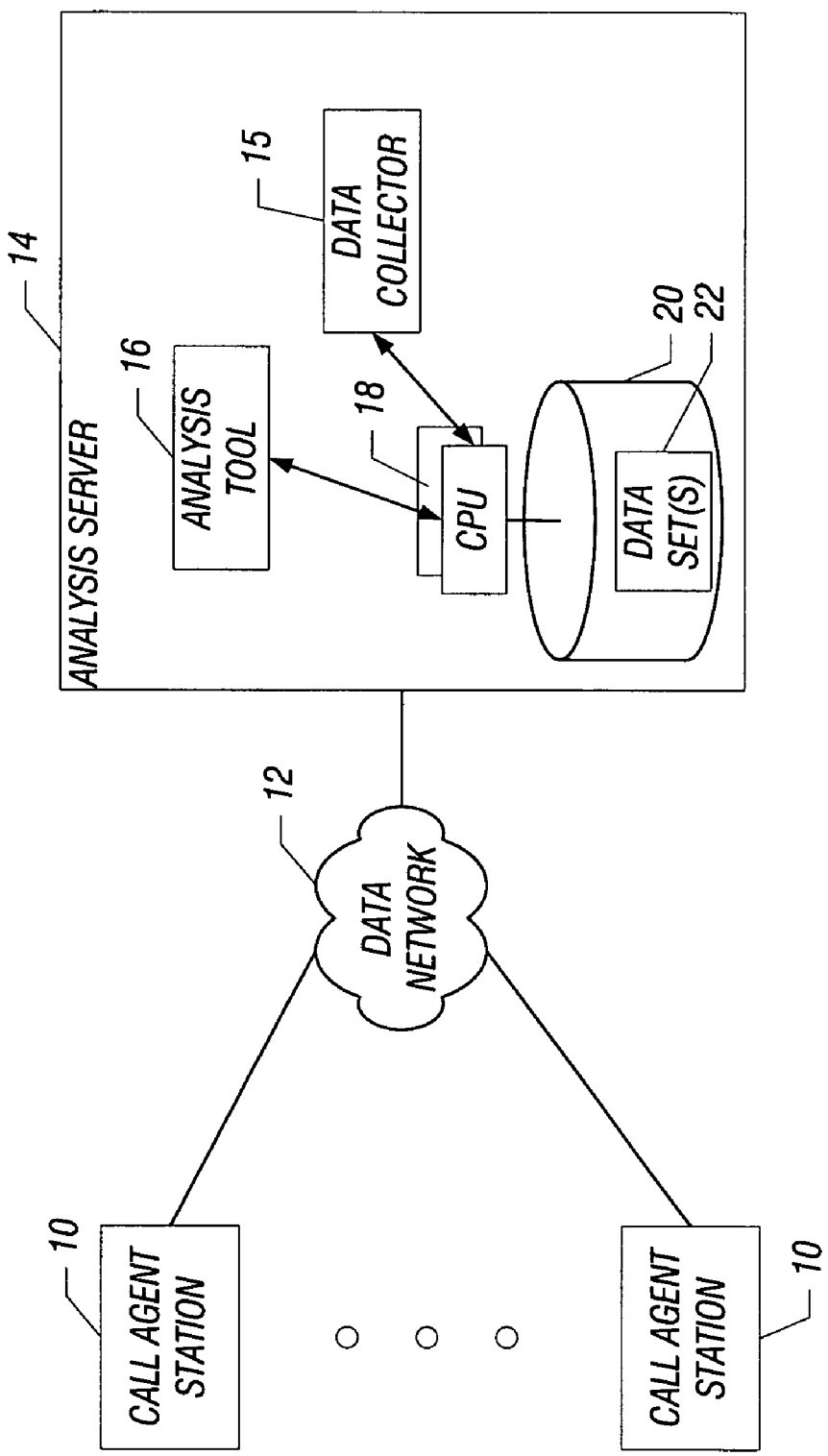
FIG. 1 is a block diagram of a network that includes call agent stations coupled to an analysis server, according to an embodiment.

FIG. 1 illustrates nodes coupled to a data network 12, where the nodes include call agent stations 10 and an analysis server 14. In the example of FIG. 1, the call agent stations 10 are associated with call agents (such as support personnel) in a customer support organization. The call agent stations 10 communicate over the data network 12 to the analysis server 14. As call agents receive calls from customers, information pertaining to the calls is entered by the call agents into the call agent stations 10. The entered information is communicated over the data network 12 to the analysis server 14, where a data collector 15 stores the information in one or more data sets 22.

The one or more data sets 22 are stored in a storage 20. The storage 20 can be persistent storage (such as magnetic or optical disk drives or non-volatile semiconductor memory devices), volatile memory (such as dynamic random access memories or static random access memories), or other types of storage devices. The storage 20 is connected to one or plural central processing units (CPUs) 18 in the analysis server 14. Alternatively, the one or more data sets 22 are stored on a database system separate from the analysis server 14.

The data collector 15 is executable on the one or plural CPU(s) 18. Also, as depicted in FIG. 1, the analysis server 14 includes an analysis tool 16 that is also executable on the CPU(s) 18. The analysis tool 16 performs analysis of the information contained in the data set(s) 22 stored in the storage 20. The information in the data set(s) 22 is collected as individual cases or incidents associated with calls received by call agents at call agent stations 10. A "case" or "incident" refers to a data item that represents a thing, event, or some other item. Each case or incident is associated with predefined information (e.g., product description, summary of problem, time of event, and so forth). The terms "case" and "incident" are used interchangeably herein.

The analysis tool 16 in the analysis server 14 is an interactive analysis tool that allows a user to interact with the analysis tool 16 for the purpose of identifying categories relevant for the cases contained in the data set(s) 22. The analysis tool 16 also enables the creation of training cases, based on user input (described further below), for the purpose of training a categorizer or plural categorizers in the analysis tool 16. Note that the cases stored in the data set(s) 22 include unlabeled cases (cases that are not initially identified with any particular category or categories) as well as labeled cases (cases that have been labeled as belonging to a category or plural categories).

In the customer support context, a "case" represents an instance of an interaction between a customer (e.g., a user, patron, subscriber, visitor, member, employee, participant, constituent, supplier, partner, etc.) and an organization (e.g., company, manufacturer, store, provider, employer, representative, etc.) that is indicative of satisfaction or dissatisfaction with something at least partially under control of the entity or another party the entity represents, A "category" (e.g., problem, issue, concern, etc.) represents an underlying reason for the interaction (such as satisfaction or dissatisfaction that led to the case), Such categories can reflect problems associated with a product or service (e.g., defects in product design or manufacture, hardware problems, software problems, hard disk problems, battery problems, and so forth), difficulties in understanding how to correctly use a product or service, difficulty obtaining a product or service, difficulty obtaining information about a product or service, concerns about the value of a product or service, desires for features lacking in a product or service, poor experience interacting with the entity, and so forth. Other entity/customer relationships (e.g., employer/employee, government/constituent) will have similar sets of categories reflecting the types of concerns the customers have and the types of control the entities have. In other environments, other types of categories are employed.

Although described in the context of a customer support environment that includes call agents receiving calls at call agent stations, other embodiments of the invention are applicable to other types of systems for other types of organizations (e.g., educational organizations, government organizations, business organizations, financial organizations, and so forth).

According to some embodiments, the analysis tool 16 is able to compute quantification measures with respect to various categories based on categorizations performed by a categorizer (or plural categorizers). The analysis tool 16 is also able to perform ranking of categories based on the computed quantification measures. Based on the ranking information provided by the analysis tool 16, an action can be taken with respect to a category (or multiple categories) to address an issue (or issues) associated with the category (or categories). For example, the category can be associated with a particular problem of a customer support organization that has to be remedied. By using the ranking information provided by the analysis tool 16 in accordance with some embodiments, an organization or user can identify higher priority categories (such as categories associated with the largest volume of customer calls, the categories associated with the largest impact on revenue, etc.) for which the organization or user should expend resources to resolve.

Figure 2:
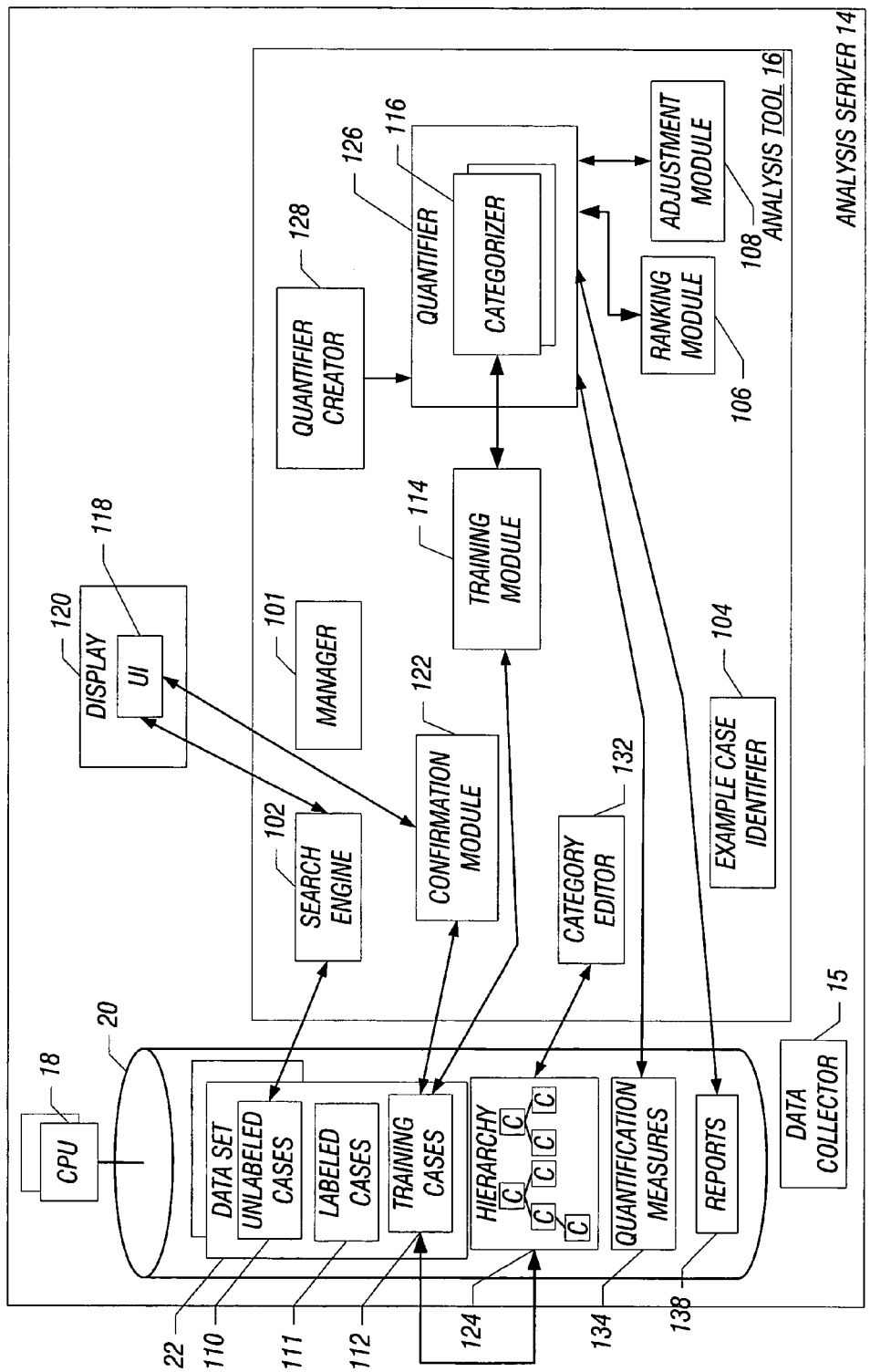
FIG. 2 is a block diagram of the analysis server of FIG. 1 that incorporates an analysis tool according to an embodiment of the invention.

FIG. 2 illustrates the components of the analysis tool 16 and content of the storage 20 in accordance with an embodiment, in greater detail. The analysis tool 16 contains various modules according to some embodiments of the invention that are executable on the CPU(s) 18. The modules include modules that form an optional search-and-confirm mechanism for performing a search-and-confirm procedure to develop training information (in the form of training cases 112 according to some embodiments) to be used for training a categorizer (or plural categorizers) 116. Training a categorizer refers to building or modifying a categorizer based on the training cases, including a positive training set of cases and a negative training set of cases for each category.

In alternative embodiments, a categorizer can be trained without using the search-and-confirm mechanism to develop training cases. For example, the categorizer can be trained using a machine-learning algorithm based on data associated with a set of training cases developed by another mechanism. A machine-learning algorithm is an algorithm that takes as input a training set of cases labeled with correct categories. The output of the machine-learning algorithm is a trained categorizer that is able to categorize or classify a case into one or more categories. Examples of machine-learning algorithms include the following: a support vector machine learning algorithm; naïve Bayes network learning algorithm; a Bayesian network learning algorithm; a neural network learning algorithm; and a decision tree learning algorithm.

In accordance with some embodiments, concurrently with the search-and-confirm procedure for the purpose of developing categorizer training cases, new categories (such as for issues associated with a customer support organization) can be discovered or existing categories modified. Examples of issues associated with a customer support organization include product problems (e.g., problems with a computer display, battery, software, wireless hardware, and so forth). As new categories are added or existing categories modified, training cases are further developed for these new or modified categories to further train the categorizer 116.

The trained categorizer 116 is then used to categorize cases of the data set(s) 22 into one or more categories. In alternative implementations, multiple trained categorizers 116 can be used to categorize cases of the data set(s) 22 into one or more categories. As the categorizer 116 categorizes cases, quantification of the cases in each category is performed by a quantifier 126. "Quantification" refers to the computation of one or more of the following quantification measures: (1) a quantity of cases in each category; and (2) an aggregate (e.g., sum, average, maximum, minimum, etc.) of a data field associated with each of the cases in the respective category. For example, the quantification measure can represent a sum of labor time and/or parts costs involved in resolving cases in each category.

The quantification measures 134 produced by the quantifier 126 allow a ranking module 106 in the analysis tool 16 to provide information to identify higher priority categories, based on one or more predefined criteria. Providing information to identify higher priority categories enables ranking of the categories so that an organization can properly and efficiently allocate resources to the more important issues. For example, the ranking can enable a customer support organization to identify the top (or most significant) ten (or other predetermined number) customer support issues that should be given more attention. The information identifying the higher priority categories is provided for a predetermined frame of reference, such as a predetermined time period, product line, geographic region, and so forth. In addition to identifying the top issues, a user is also given the ability to drill down to obtain more detailed information regarding any of the identified issues. This ability to drill down for more detail allows a user to quantify an issue, identify sub-issues, obtain detailed data on cases associated with the issue, and obtain example cases for the issue.

As noted above, based on the ranking performed by the analysis tool 16, a user or organization can identify a category (or plural categories) for which an action is taken to address the category (such as to fix a problem or to address some other type of issue). Examples of actions that can be taken with respect to a category include one or more of: allocating a sum of money (or otherwise defining a budget); allocating a physical resource (e.g., equipment); hiring a person; assigning a task to a person; writing a document (such as a help document); modifying an existing document; identifying a document; altering availability of a document (such as to make the document more widely available such as posting the document on a web site); altering an organization of a web site; modifying a design of a product; modifying a packaging of a product; modifying a manufacturing process for a product; creating a software program; modifying a software program; creating a patch for a software program; contacting a customer, vendor, supplier, employee, or partner; modifying a marketing campaign; changing response time of service providers; training service personnel; discontinuing efforts that are no longer required; changing the process of writing and delivery of software programs; taking actions with reference to seasonal fluctuations; provide reports to customers regarding how issues are being monitored and addressed; and other actions.

As discussed above, the analysis tool 16 effectively provides an interactive package useable by a user to efficiently and accurately identify categories, train a categorizer, categorize cases, produce quantification measure(s) for the categorized cases, and provide information identifying higher priority categories. The analysis tool 16 enables the category identification, categorizer training, case categorization, quantification, and higher priority identification processes to be performed generally in a concurrent manner for enhanced efficiency. Also, the analysis tool 16 simplifies the processes of identifying new categories for cases (unlabeled cases 110 and/or labeled cases 111) in the data set(s) 22; developing training cases for training the categorizer; training the categorizer; categorizing cases; quantifying the categorized cases; and providing information identifying higher priority categories.

Although the various modules depicted in FIG. 2 are part of one analysis tool 16, it is contemplated that, in other implementations, the modules can be implemented in multiple tools that are deployable in the analysis server 14 or even on other systems. Moreover, in some cases, the categorizer(s) 116, quantifier 126, and ranking module 106 can be provided as an output of the analysis tool 16 for use on other data sets or for use on other systems. Note that although the categorizer(s) 116, quantifier 126, and ranking module 106 are depicted as separate modules, the modules can be integrated into a single module in other implementations. Also, note that some of the modules in the analysis tool 16 can be omitted in other embodiments.

Optionally, the identification of categories is performed by a user of the analysis tool 16 as the user uses the search-and-confirm mechanism of the tool 16. The search-and-confirm mechanism includes the search engine 102 and confirmation module 122. The search engine 102 enables a user to submit a search and to display a list of cases matching the search criterion or criteria. With the confirmation module 122, the user is able to confirm or disconfirm whether each of the displayed cases belongs to a category (or plural categories).

The search engine 102 is able to receive a query from a user through the user interface 118, and to issue the query to identify cases from the data set(s) 22. The search engine 102 displays information regarding identified cases from among the unlabeled cases 110 that match the query. The displayed information regarding the identified cases is presented in the user interface 118. The user interface 118 can be a graphical user interface, according to an example implementation.

The information displayed in the user interface 118 by the search engine 102 in response to the query includes information regarding a subset of the unlabeled cases 110 that match search criterion(ia) (in the form of search terms) in the query. A case is said to "match" a query if any information associated with the case satisfies some criterion, such as search term, in the query. A "term" specified by a query refers to any string, substring, regular expression, glob expression, non-textual object (e.g., audio object, video object, etc.), or any other term. A "glob expression" is an expression containing an operator indicating presence of zero or more characters (e.g., *), an arbitrary character (e.g., ?), a range of characters, or a range of strings. A case matches a search term in the query if any information associated with the case satisfies the search term in any specified manner (in other words, equality between the case information and the search term is not required, since the query can specify other forms of relationships between the case information and search term). Not all cases that match need to be used. The user interface 118 displays a summary of each of the matching cases to provide a user with information regarding each case. The process of specifying a query and viewing results of matching cases is referred to as a "scooping" process. Following the scooping process, a "confirming" process is performed in which a user is able to confirm whether or not each of the matching cases belongs to a particular category (by selecting or deselecting displayed fields or other indicators).

User confirmation (or disconfirmation) is monitored by the confirmation module 122. Not all displayed cases need to be confirmed or disconfirmed. For cases that have been correctly matched to a category, such cases are added to a positive training set of cases. On the other hand, for cases that have been incorrectly matched, the confirmation module 122 adds such incorrectly matched cases to a negative training set of cases. The positive and negative training sets, which are part of the training cases 112 stored in the data set 22, are accessed by the training module 114 for training the categorizer 116.

The search engine 102 and confirmation module 122 thus cooperate to develop training cases 112 from cases in the data set 22 (based on user confirmation and disconfirmation), which training cases 112 are used by the training module 114 to train the categorizer 116. As noted above, the search-and-confirm mechanism (provided by the search engine 102 and confirmation module 122) can be omitted in alternative embodiments. In some alternative embodiments, the training module 114 can implement another machine-learning algorithm for developing the categorizer 116 based on an input set in which cases have been labeled as belonging to particular categories.

In some embodiments, during the searching and confirming using the optional search-and-confirm mechanism, a user can determine that additional categories should be added to a hierarchy 124 of categories, or existing categories in the hierarchy 124 modified. Using a category editor 132 in the analysis tool 16, the user can move, add, modify, or even delete categories (represented by the hierarchy 124 of categories stored in a storage 20). In the example hierarchy 124 depicted in FIG. 2, each box designated "C" represents a category. As depicted, a category can have subcategories, which also can have subcategories. As categories are added, deleted, or modified, additional training cases can be developed for each category, with the training module 114 training the categorizer 116 based on these additional training cases. Adding, deleting, or modifying categories (or subcategories) causes the positive and negative training sets of the training cases 112 to be modified.

The category editor 132 is responsive to user input at a user interface (UI) 118 (presented in a display monitor 120) to add categories (or subcategories), delete categories (or subcategories), or modify categories (or subcategories). In response to user input to add, delete, or modify categories (or subcategories), the category editor 132 is able to modify the hierarchy 124 of categories. In some embodiments, the category editor 132 may be omitted, and the search-and-confirm procedure may take place with respect to a predefined set of categories.

Note that, initially, there may already be a developed set of categories before the search-and-confirm procedure is started, which existing set of categories can be used as a starting or initial set of categories. In an alternative scenario, such as with a new project, no categories may exist. In this alternative scenario, the user may create one or a few categories as the starting point, or the one or few categories can be created by another technique, described further below.

In one embodiment, the categories in the hierarchy 124 of categories are in a directed acyclic graph (DAG) rather than a tree. In other words, any category in the hierarchy 124 can have not only several children, but also several parents. However, a category cannot be simultaneously an ancestor and a descendant of another category. Subcategories (associated with a particular category) are considered the children of the particular category. In alternative implementations, other structural relationships of categories can be employed.

A manager module 101 in the analysis tool 16 performs overall management operations, such as managing the storing of data (including training cases 112 and hierarchy 124 of categories) in the storage 20 and coordination among the various modules of the analysis tool 16.

As the positive and negative training sets are modified based on the user confirming and disconfirming acts, and based on modification of the hierarchy 124 of categories, the modified positive and negative training sets are propagated through the hierarchy 124 of categories to enable the training module 114 to train the categorizer 116 for the categories.

During development of the categorizer 116, the quantifier 126 is also created by a quantifier creator module 128 in the analysis tool 16. The quantifier 126 can be in any format, such as an Extensible Markup Language (XML) format, C code format, or any other format. In the arrangement of FIG. 1, the categorizer(s) 116 is(are) part of the quantifier 126. However, in other embodiments, the quantifier 126 and categorizer(s) 116 are separate modules. In either case, the quantifier 126 cooperates with the categorizer(s) 116 to perform automated quantification of the cases. Such cooperation may include making requests of (or otherwise interacting with) the categorizer(s) 116 running on computer 100 or on other computers or it may include using the result of prior executions of the categorizer(s) 116. In this manner, manual quantification (which can be time intensive, inaccurate, and expensive) is replaced with quantification by the quantifier 126 using categorizer(s) 116 trained according to some embodiments of the invention.

The quantification performed by the quantifier 126 includes computing, for one or more of the categories in the hierarchy 124 of categories, a quantification measure that represents the number of cases in each category. Alternatively, the quantifier 126 is able to generate another quantification measure, such as a sum or some other aggregate of a data field associated with the cases that belong to each category. As an example, the quantification can represent a measure (e.g., sum) of one or more of the following: the duration of calls; cost of repair; amount of time to resolve the calls; amount of lost revenue; an amount of money to resolve calls; amount of lost revenue due to calls; a degree of customer aggravation; an amount of time spent by customers before initiating a call; an amount of time spent by customers during the call; an amount of time spent diagnosing cases; an amount of money spent by customers; an amount of money spent interacting with customers; an amount of money spent diagnosing the cases; and a number of customers who declined to initiate a call; and so forth. Other examples of aggregation include an average or mean, a standard deviation, a 95% (or other percentage level) confidence interval, a variance, a minimum, a maximum, a median, a mode, a geometric mean, a harmonic mean, a percentile rank, an ordinal statistic, or other statistic of the values in the data field associated with the cases or a value computed based on fitting a model to the values in the data field associated with the cases. The data field of a case can contain a single value or a collection of values, or the data field can be a value or collection of values computed from other values associated with the case. In some embodiments the aggregate may involve a plurality of data fields associated with each case. The quantification measures computed by the quantifier 126 are stored as quantification measures 136 in the storage 20.

Note that the quantification measures computed by the quantifier 126 are estimated measures in light of the fact that the categorization performed by a categorizer 116 is often not absolutely accurate. For example, the accuracy of a trained categorizer can be impacted by the quality of training cases used to train the categorizer. As explained further below, to compensate for inaccuracies of the categorizer 116, calibration (or adjustment) of the quantifier 126 is performed based on some indication of the ability of the categorizer 116 to categorize cases in a data set.

The quantifier 126 is able to display the quantification measures it computes either numerically, textually, or graphically. Also, the quantifier 126 is able to generate one or more reports 138 that present these quantifications. The reports 138 optionally also provide comparative quantifications, such as providing a comparison of cases in different data sets or in different partitions of one data set.

Moreover, in some embodiments, the analysis tool 16 can provide the quantifier 126, along with one or plural associated categorizer(s) 116, as an output. The output quantifier 126 and categorizer(s) 116 is useable on other data sets to perform categorization and quantification on the other data sets. By being able to re-run the quantifier 126 and categorizer(s) 116 on other data sets, no additional substantial manual labor is involved in applying the quantifier 126 to the other data sets. For example, using the output quantifier 126, the quantification analysis can be easily repeated daily, weekly, monthly, annually, and so forth.

The analysis tool 16 also includes the ranking module 106 for providing information to identify higher priority categories based on quantification measure(s) provided by the quantifier 126. Providing information to identify higher priority categories includes providing information to identify some order of the categories (or to rank the categories) based on predetermined one or more criteria. The information identifying the higher priority categories are presented in report(s) 138.

Identifying priority of categories can be based on one or more of the following criteria, as examples: the number of calls in each category; the amount of time involved in resolving calls in the category; the amount of money spent by the organization to resolve calls in the category; the amount of time, money, or aggravation of the customer (customer dissatisfaction) in resolving calls in the category; the estimated amount of lost future revenue due to calls in the category; and the estimated number of customers having the problem associated with the category who simply gave up rather than call (lost customers). Note that the above criteria are provided for the purpose of example. In other embodiments, other criteria can be used by the ranking module 106.

The ranking module 106 also takes into account whether a "sufficient number" of cases (e.g., calls at a customer support organization) have been considered. The "sufficient number" can be a predefined fixed number or a number that accounts for a given fraction of calls or amount of money spent or some other factor. Consideration of a "sufficient number" of cases is an indication of how well trained the categorizer 116 is. The more cases considered, the better trained the categorizer 116, and thus the more accurate the quantification measure(s) provided by the quantifier 126. Thus, the ranking module 106 may determine that a report should not be generated until the number of cases considered has exceeded a threshold that represents this "sufficient number."

The report produced by the ranking module 106 can provide details regarding various categories in the hierarchy 124 of categories. For example, the report can show details regarding the high-level categories (e.g., general customer support issues such as issues associated with "hardware" or "software"). Alternatively, the report can show details regarding intermediate categories or low-level categories (e.g., subcategories of "hardware" such as "battery," "wireless interface," "keyboard," etc.). The report generated can also allow a user to click user-selectable fields to drill down into subcategories of general categories. The report can present the information in the form of a graph (such as a pie chart, bar chart, stacked bar chart, line chart, scatter plot, bar-and-whiskers plot) or in any other format (e.g., a table). The report can be a textual document (including graphs), a spreadsheet, an interactive document (e.g., a web page), or some other type of document. With an interactive document, such as a web page, a user can focus on subcategories (such as problems with a keyboard), and ignore the other categories. Also, the interactive document can allow a user to change the criteria used to rank the categories, such that the ranking module 106 is responsive to user input in the interactive document to re-rank the categories and produce a modified output report 138.

The details of the report presented by the ranking module 106 include the quantification measures provided by the quantifier 126. As noted above, the quantification measures include a number of cases in each category and/or an aggregate of some data field associated with the cases. In addition to providing a quantification of higher priority issues, the report also enables a user to obtain sub-issues (in the form of subcategories), detailed information regarding each issue, and example cases for each issue.

Each quantification measure provided in the report can be the actual quantification measure produced by the quantifier 126, or alternatively, can be an adjusted (extrapolated or normalized) value produced by an adjustment module 108. Adjusted quantification measures include quantification measures extrapolated into the future, which can be based on a simple trend of the quantification measures. Alternatively, adjusted quantification measures include quantification measures normalized based on sales numbers and trends, marketing promotions, seasonal buying patterns, product end-of-life information, product introduction information, and so forth. Adjusted quantification measures can also reflect estimated measures in a larger population from which the data set 22 forms a sample. The ranking module 106 can take into account the adjusted quantification measures from the adjustment module 108 when producing the ranking of categories in a report 138. In some cases, adjusted quantification measures allow the ranking module 106 to determine that a category that may be a major issue currently may not be a major issue in the future, based on a trend, a product close to end-of-life, and so forth. The ranking module 106 is also able to compare categories in different time horizons based on the expected amount of time involved in addressing each category.

Another module in the analysis tool 16 is an example case identifier 104, which is able to identify example cases for each category. The ability to develop example cases by the example case identifier 104 enables the user to better understand each category. For example, by looking at relevant example cases for each category, a user may be able to better understand a problem represented by the category. The example cases developed by the example case identifier 104 can be incorporated into the report generated by the ranking module 106. Alternatively, the report 138 developed by the ranking module 106 can include links to example cases. In yet another implementation, the example cases are accessible through the user interface 118 by use of an application programming interface (API).

The example case identifier 104 selects one or more example cases for each category based on the confidence level assigned by the categorizer 116 to each example case. Thus, the example case identifier 104 presents example case(s) to a user if a confidence level exceeds a predefined threshold. Also, if multiple cases are presented for each category, then the multiple cases are selected such that they are dissimilar to each other to provide a better illustration of cases associated with the category. Also, for each case presented by the example case identifier 104 for a category, the example case identifier 104 can provide some indication of how many similar cases are present. The user can also be presented with a feature to enable access of the similar cases, if desired.

In yet another implementation, the cases of a particular category are partitioned by a clustering algorithm, with the most competently predicted case for each cluster identified by the example case identifier 104 for the category. Thus, if multiple clusters are present in a particular category, then an example case would be provided for each cluster.

The ranking module 106 can also present details regarding a subset of cases in a category. For each category, information pertaining to the subsets can be presented side-by-side so that a user can compare information regarding the multiple subsets for the category.

Figure 3:
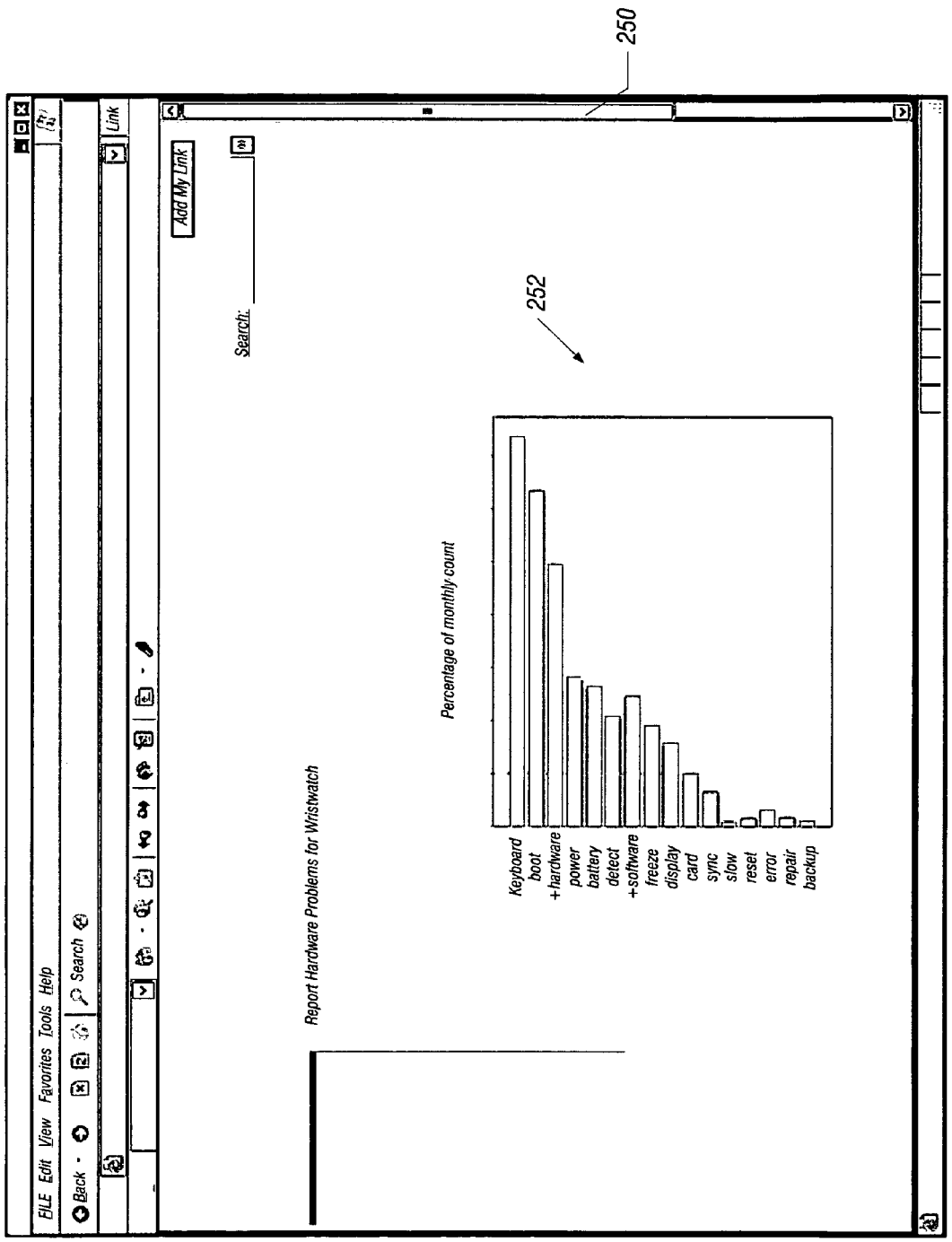
FIGS. 3 and 4 illustrate graphical user interface screens for presenting information associated with the analysis tool, according to an embodiment.

FIG. 3 illustrates an example of a GUI screen 250 showing an example report produced by the ranking module 106 (FIG. 2) that produces a ranking of categories in the form of a bar chart 252. Each bar in the bar chart 252 corresponds to a category. In the example of FIG. 3, the length of each bar in the bar chart 252 represents a percentage of the monthly count of cases in each category. In the bar chart 252, the "keyboard" category is associated with the highest percentage, whereas the "backup" category is associated with the lowest percentage. The categories in FIG. 3 are listed according to their respective percentages, which is one form of ranking.

In the bar chart 252, the "hardware" category and "software" category each has a "+" icon that is user selectable to enable the user to drill further into the respective categories to determine additional information regarding subcategories. Although not depicted in FIG. 3, many other types of information can be displayed for the listed categories. Also, instead of the bar chart format, the output can be in another format.

Figure 4:
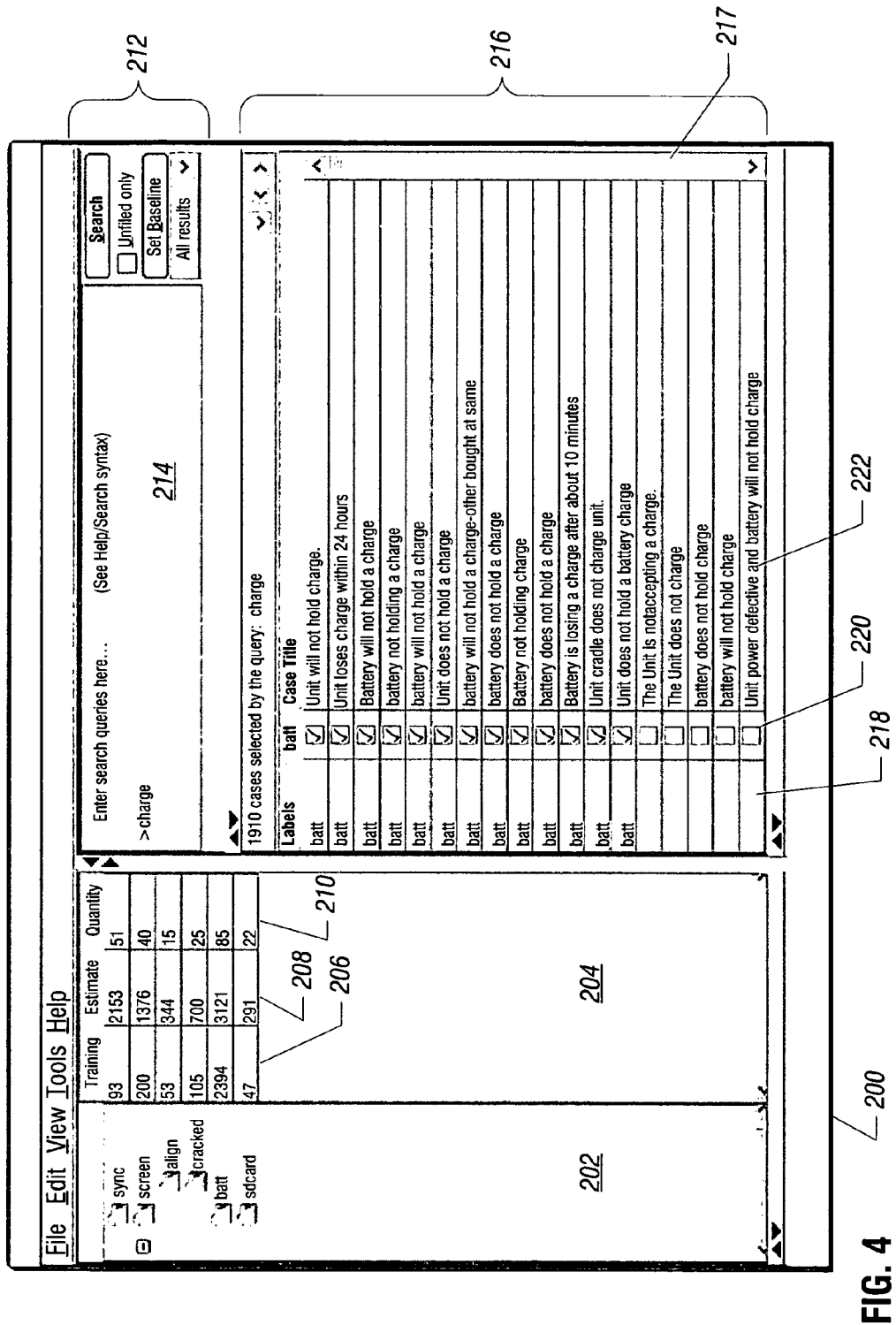

FIG. 4 illustrates an example of another GUI screen 200 that can be displayed in the user interface 118 (FIG. 2), for performing an optional search-and-confirm procedure according to some embodiments. The content of the GUI screen 200 is provided by one or more of the search engine 102, confirmation module 122, manager module 101, training module 114, category editor 132, categorizer 116, and quantifier 126.

The GUI screen 200 includes a first frame 202 that displays the hierarchy of categories (also referred to as "classmap") that is being built using the analysis tool 16 of FIG. 2. In the example depicted in FIG. 4, the four main categories include "sync," "screen," "batt," and "sdcard." Note that any of these four categories can include subcategories. For example, the "screen" category has subcategories. Examples of subcategories of the "screen" category include the "cracked" subcategory, and the "align" subcategory. The subcategories can further include subcategories to any desired depth.

The GUI screen 200 also includes a second frame 204 with a "training" column 206 to display the number of cases that have been identified by a user (either directly or by inference) as being positive cases for a given category. The "Training" column 206 lists the number of cases for each of the "sync," "screen," "batt," and "sdcard" categories. For example, in the "Training" column 206, the "sync" category has 93 cases, the "screen" category has 200 cases, the "batt" category has 2,394 cases, and the "sdcard" category has 47 cases.

Another column in the second frame 204 is an "Estimate" column 208, which displays the estimated number of cases identified by the quantifier 126 as belonging to each of the categories and subcategories. A third "Quantity" column 210 lists an estimated sum of some data field of the cases in each category, such as time spent on cases that belong in the category or cost of handling the cases in the category. The values in the "Quantity" column 210 are also provided by the quantifier 126. As other examples, the "Quantity" column 210 can indicate costs or percentages of volume of cases.

Another optional column in the second frame 204 can indicate the perceived quality of the current categorizer with respect to each particular category. Examples of information pertaining to the measure of the quality of the categorizer 116 that has been trained using training information developed according to some embodiments includes: true positive rate (the likelihood that an item in a category will be identified by the categorizer to be in the category); false negative rate (the likelihood that an item in a category will be identified by the categorizer to be not in the category); true negative rate (the likelihood that an item that is not in a category will be identified by the categorizer to be not in the category); false positive rate (the likelihood that an item that is not in a category will be identified by the categorizer to be in the category); accuracy (the likelihood that an item will be correctly identified to be or not to be in a category); recall (same as true positive rate); precision (the likelihood that an item identified to be in a category actually is in the category); bi-normal separation (a measure of the separation between the true positive rate and the false positive rate); information gain (a measure of the decrease in entropy due to the categorizer); lift (a measure of an increase in, e.g., response rate if only the cases the categorizer is most confident about are processed); stability under cross-validation (measure of the likelihood that the categorizer has or has not overfit the training information by learning to recognize individual cases rather than learning generalities that apply to unseen data); area under an ROC (receiver operating characteristic) curve (area under a curve that is a plot of true positive rate versus false positive rate for different threshold values for a categorizer); number of training cases; percentage of target training size (same as number of training cases, except with the added notion that a user has indicated a desire to see a minimum number of cases for every category); f-measure (a parameterized combination of precision and recall); total cost (an expected aggregate cost over analyzed cases considering separate individual costs for the true positives, true negatives, false positives, and false negatives); and average cost (similar to total cost, except averaged over the number of cases).

A search frame 212 is also displayed in the GUI screen 200. The search frame 212 includes a search area 214 in which a user can enter a query for performing the scooping process. As part of the scooping process, the user-provided query is submitted to the search engine 102 (FIG. 2) to retrieve a number of cases that will be displayed in a display frame 216. In the example shown in FIG. 4, the query contains the search term "charge," which means "find cases that contain a word in a case title or elsewhere that contains the word charge."

The display frame 216 displays a summary (e.g., title) of some or each of the cases identified by the search based on the query entered in the search frame 212. Note that each case is associated with several pieces of information, with the title being one of the pieces, for example. In other implementations, other pieces of information associated with the cases can be displayed. In some embodiments, the user may separately select which pieces of information are to be displayed, to be used for matching queries, and to be used for training the categorizer. In the example of FIG. 4, the leftmost column 218 of the display frame 216 indicates the category (in text form) of each of the corresponding cases. In a second column 220 of the display frame 216, user-selectable boxes are provided to allow a user to confirm whether or not the corresponding cases belong to the category displayed, in this case, the "batt" category. The user-selectable boxes are clickable by a user to perform confirmation or disconfirmation. Also, the categorizer 116 can provide an initial guess as to whether or not the displayed cases belong to the category (by displaying a check mark or leaving the user-selectable box blank).

If the result cases do not fit in one page, a scroll bar 217 is provided to enable the user to scroll to the remaining cases. Alternatively, a user may specify that the GUI screen 200 displays a set of randomly selected cases that fit within the display frame 216, such that the scroll bar 217 would not have to be used.

In the third column 222 of the display frame 216, a summary of the case, such as the case title, is illustrated. For example, the summary provided can have been previously entered by a customer support representative when answering customer calls. Even though the displayed summaries may contain mis-spellings, grammatical errors, and abbreviations, a user looking at each summary can quickly ascertain whether each respective case is associated with the category in question.

Note that each of the case titles displayed in the third column 222 of the display frame 216 contains the word "charge." Based on the displayed case title, a user can select or de-select each user-selectable box in the second column 220. In other implementations, other types of summaries can be displayed in the third column 222 to provide information that the user can use to select or de-select boxes in the second column 220. Selection of a box indicates that the user has confirmed that the particular case belongs to the category. On the other hand, when a user de-selects a box in the second column 220, that is an indication that the corresponding case does not belong to the category in question (that is, the user has disconfirmed that the case belongs to the category).

In a different embodiment, instead of displaying just one category, the display frame 216 can display multiple categories with fields that are user-selectable to confirm or disconfirm whether a case belongs to the categories. A confirmed case can be added to a positive training set, while a disconfirmed case can be added to a negative training set. The positive and negative training sets are used to train the categorizer.

As a user labels cases as belonging (or not belonging) to particular categories based on input to the confirmation module 122, training cases 112 (positive and/or negative training cases), are added. As the training cases 112 are added, the categorizer 116 is trained concurrently. The training of the categorizer 116 as positive training cases or negative training cases are added can be performed in the background (according to some embodiments) so that the training (or retraining) of the categorizer 116 does not interfere with the search and confirm processes used for identifying training cases. The trained categorizer is installed atomically once the training is complete. If the user makes changes to the categories while the categorizer is training, the training can be stopped and restarted with the modified categories. Note that the term "training" refers to either the first training of a categorizer or a retraining of the categorizer.

Also, as categories are added, modified, and/or deleted, the categories displayed in the first frame 202 are changed by the category editor 132 (FIG. 2). During the search, confirm, and training processes, the "Estimate" and "Quantity" columns 208 and 210 in the second frame 204 are also continually updated by the quantifier 126.

FIGS. 5A-5H show flow diagrams of processes that involve a search-and-confirm procedure, training procedure, a quantifying procedure, and a ranking procedure, according to an embodiment.

Figure 5A:
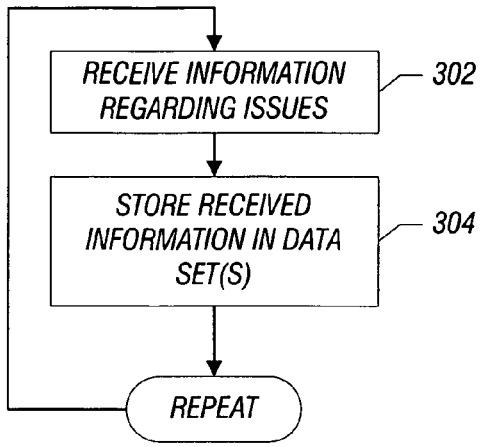

As shown in FIG. 5A, the data collector 15 (FIG. 2) receives (at 302) information regarding customer support issues, which information is received from one or plural call agent stations 10 (FIG. 1). In a different embodiment, the data collector 15 receives information regarding other issues in other contexts. The data collector 15 stores (at 304) information regarding customer support issues in a data set (or plural data sets).

Examples of the types of information that are received and stored include information such as the time and duration of call; information about the product being called about, replacement parts ordered, compensation offered, or repair people sent; information automatically gathered from a computer of a customer; uniform resource locators (URL(s)) or other resources visited and documents consulted in attempting to solve the problem; linked information on the demographics of the customer (e.g., location, age, gender, technological sophistication, loyalty, generated revenue, etc.); call agent-entered description of the state-of-mind of the customer; description of interaction between call agents and customers; call agent selection of a category or problem based on a call; transcripts or recording of on-line chat sessions or telephone conversations; call agent-written short summaries of a problem; customer e-mail messages; records of pages visited on a web site (such as on-line documents viewed by customer or call agent); outputs from a diagnostic program; data stored in a database (e.g., data relating to a prior support call, information relating to a purchase, and demographic information of a customer); computer files received from a customer; survey data; data received by a monitoring device; and others.

Steps 302 and 304 are repeated as additional information regarding issues are received.

Next, an optional search-and-confirm procedure (FIGS. 5B-5C) may be performed for the purpose of developing training cases for categories associated with the unlabeled cases. The training cases is used to train one or plural categorizers 116 (FIG. 2).

The analysis tool 16 reads an initial hierarchy of categories (at 310). One way of creating the initial hierarchy categories is based on user input. In one scenario where training cases are to be developed for a new project, a set of categories may not yet exist. In this scenario, a user can create one or a few categories as the starting point. An expert may create the categories based on a preconceived notion of the relevant categories (such as problems) associated with a particular project. Alternatively, the expert may create the one or few categories based on prior experience or common knowledge of the expert. For example, it may be well known that a product has problems with battery life, wireless connectivity, and keys following off. In a second approach, an expert may "eyeball" cases by scooping random samples and seeing which problems jump out at the expert. A user or expert can add, delete, or modify categories using the category editor 126 (FIG. 2).

Alternatively, instead of relying on a human user or expert, an automated module in the analysis tool 16, can be used to examine the unlabeled cases 110 and determine based on this examination one or plural possible categories. For example, one technique that can be used by such a module is a cluster-detecting technique based on a clustering algorithm to identify groupings of cases. These groupings of cases identified are reviewed by a user or expert to determine which categories are appropriate to add to an initial set of categories. Note that this initial set of categories provided (at 310) does not have to be highly accurate categories, nor do these categories have to survive the process of developing the categories. The initial set of categories merely provides a starting point.

In a different scenario, there may already be a set of extant categories that can be used as a starting point for further development of training cases.

After one or a few initial categories have been identified (at 319) for the purpose of searching and confirming, the scooping process can begin. To start the scooping process, a user enters a query relating to a category into the search area 214 of the GUI screen 200 (FIG. 4). A query relates to a category if the query contains search term(s) for finding cases that belong to the category. Note that a query relating to one category can also relate to other categories as well; in other words, in some scenarios, a query can contain search terms to find cases belonging to multiple categories. The query, received (at 320) by the search engine 102 (FIG. 2), can be in any of a number of formats, including a Boolean expression, a structured query language (SQL) query, or some other type of query. The search engine 102 can also have the capability of matching search terms specified by the query with related terms, such as synonyms. The related terms that are to be matched to the search term specified in the query can be grouped into a collection of terms. A case containing a term that matches any of the collection of terms is considered to be a match by the search engine 102.

In response to the query, the search engine 102 identifies (at 322) the matching set of cases and displays (at 324) the identified set of cases in the user interface 118 (FIG. 2). As depicted in the example GUI screen 200 of FIG. 4, the displayed summary of the matching cases includes numbers, dates, and short strings, with a single line per case, in a table. Alternatively, the identified cases may be displayed in two-dimensional or three-dimensional graphs, or in other formats. Optionally, a user can also access information in addition to the displayed information, such as by clicking on a link. Additionally, the displayed information includes the category (or categories) that a user (or the categorizer) has associated with the case (either based on an earlier training set or based on a prediction by the categorizer).

As noted above, the submission of the query, identification of cases matching the query, and the display of the cases is part of the scooping process. Typically, the scooping process has been performed with a hypothesis in the form of "cases that match this query should be training examples for category C."

After the cases have been displayed by the search engine 102, then the confirmation module 122 can receive (at 326) user confirmation or disconfirmation. For example, some of the cases may have been identified or inferred as being or not being in the category (or categories) in question. In the example of FIG. 4, some of the user-selectable boxes in column 220 of the display frame 116 can have been checked based on this previous identification or inference.

In an embodiment, the categorizer can determine whether a matching case should be indicated as belonging to a category by computing a confidence indication. The confidence indication is compared to a predefined threshold, and if the confidence indication is greater than the predefined threshold, the categorizer identifies the matching case as belonging to the category.

The user next goes through the displayed cases and either confirms or disconfirms by respectively checking the box (or leaving the box checked) or un-checking the box (or leaving the box un-checked) in the column 220. Note that a case can belong to more than one category, so that a scoop for one category may return cases that have already been labeled as belonging to another category. Note that check boxes constitute one example implementation for confirming or disconfirming that a case belongs to a category. There are numerous other techniques in other implementations, including techniques to check plural boxes at the same time.

For those cases that have been indicated as belong to the category in question (based on user selection of the box in column 220 in FIG. 4), the confirmation module 122 modifies (at 328) the positive training set by adding such cases to the positive training set for the category. For those cases that have been incorrectly matched, which are cases that the categorizer 116 initially identified as belonging to the category but which the user has disconfirmed as belonging to the category, the confirmation module 122 modifies (at 328) the negative training set by adding such cases to the negative training set for the category. Optionally, when the user disconfirms a case as belonging to a first category, the user can confirm that the case belongs to another category (although the user does not have to). The positive training set of cases and negative training set of cases are part of the training cases 112 in FIG. 2. Note that there can be plural sets of positive cases and plural sets of negative cases for respective categories.

Steps 320-328 are repeated to develop training cases for other categories or to more fully develop training cases for a current category.

Figure 5C:
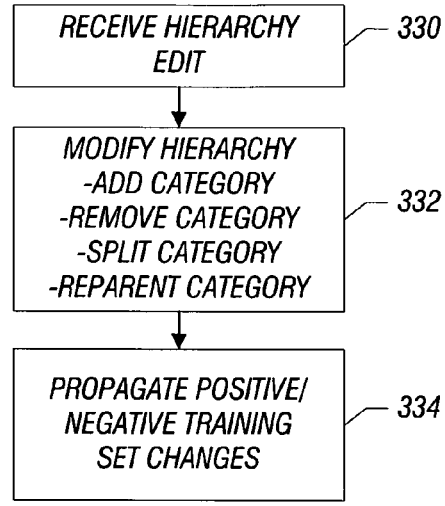
Figure 5B:
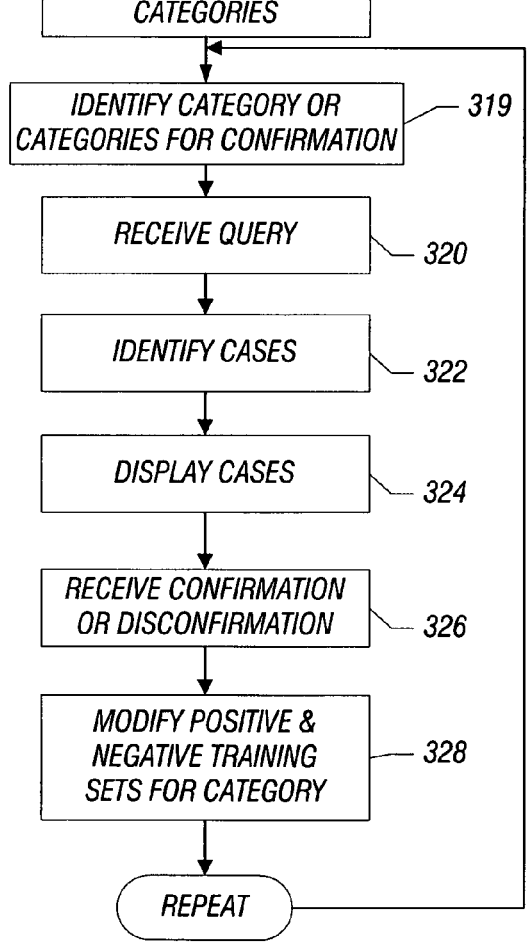

In an alternative embodiment where the search-and-confirm procedure of FIG. 5B is not used, a machine-learning algorithm can be used for producing a trained categorizer that is based on training cases developed by another technique.

In accordance with some embodiments, as part of the process of confirming or disconfirming cases, the user may realize that a new category should be created. In the example depicted in FIG. 4, the user can do this using one of the menu items of the GUI screen 200, such as the "File," "Edit," or "Tools" menu items, or some other control element in the GUI screen 200. As shown in FIG. 5C, the category editor 126 receives (at 330) an edit input (through the GUI screen 200) regarding a newly created category (or subcategory), a modified category (or subcategory), or a deleted category (or subcategory). In response to user input adding a new category (or subcategory), modifying a category (or subcategory), or deleting a category (or subcategory), the category editor 126 modifies (at 332) the hierarchy 124 of categories (FIG. 2). In the present discussion, it is noted that adding, deleting, or modifying a category refers to adding, deleting, or modifying a category and/or a subcategory. The user can also split a category (into multiple categories) or reparent a category (indicate one category as being a parent of another category).

The modification of the hierarchy 124 of categories can result in changes of the positive and negative training sets, which changes are propagated (at 334).

Since any added or modified category is based on a user's examination of the summaries of cases listed in response to the query, the added or modified category is likely to be semantically meaningful (the label for the category or subcategory is descriptive of the corresponding problem or other event or item). Also, the set of categories created is not biased by any requirement that all cases have to be labeled or that all cases have to be assigned to a single category.

As discussed, as the user performs confirm/disconfirm and as categories or subcategories are added/modified/deleted, changes occur in the positive and negative training sets, which are propagated (at 340) through the hierarchy 124 of categories, as depicted in FIG. 5D. The display of cases per category is updated (at 342).

As the training cases 112 are being updated by the scooping and confirming processes described above, the categorizer 116 is trained (at 346) in the background for categories whose positive or training sets have changed. Optionally, the retraining (at 346) can be delayed, by use of a timer involving optional steps 343 and 344. The timer is set or updated (at 343) to expire after a predetermined amount of time. Any change to the training cases will cause the process to loop back to step 340 (which will cause the timer to again be set or updated at 343). After some period of stability (a period during which no changes occur) has been detected, the timer expires (at 344), which allows the categorizer retraining (at 346) to be performed. Checking for stability at 344 avoids the situation where many successive changes in the positive and training sets in a short period of time caused by user confirming/disconfirming or category modification causes the retraining to restart many times. The retraining of the categorizer 116 can occur generally concurrently with the scooping and confirming processes so that the user can continue to perform the scooping and confirming processes even while the categorizer is being trained, subject to the training module 114 (optionally) waiting for expiration of the timer to ensure some period of stability. An output provided by the scooping process, confirming process, and training process described above is a categorizer, or plural categorizers.

The retrained categorizer is invoked to re-categorize or relabel (at 348) the cases 112. Also, the quality of categorization or labeling performed by the categorizer can be determined (at 350), and a measure of this quality can be displayed (at 352). The quality measures of a categorizer are listed above. If the quality measures of the categorizations performed by the trained categorizer indicate that the categorizations are either incorrect or of insufficient confidence (quality measure being less than a predefined threshold), the categorizer can be retrained again.

As depicted in FIG. 5E, at some point (which can be during or after the categorizer(s) has been trained and has been invoked to categorize cases in the one or more data sets 22), the quantifier 126 is created (at 360). The quantifier 126 is also calibrated (at 362) to take into account any inaccuracies present in the categorizer 116. As noted above, a categorizer usually does not perform categorization of cases with perfect accuracy. An indication of quality of a categorizer that has been trained is provided by one or more of the quality measures listed above. In some embodiments, the quantifier 126 is calibrated based on the quality measures.

In one embodiment, to calibrate the quantifier 126 with respect to a category C, the analysis tool 16 determines the fraction (TPR) of the time that the categorizer is correct when presented with a case that should be categorized in a category C (also referred to as the true positive rate), and the fraction (FPR) of the time that the categorizer is wrong when presented with a case that should not be categorized in the category C (also referred to as the false positive rate). Assuming that a data set includes a total of T cases, of which N cases have been categorized in the category C, then the calibration to be performed by the calibrated quantifier 126 on the value N is as follows:

$$N'=(N-FPR \cdot T)/(TPR-FPR),$$

where N' is the calibrated N value.

Similar fractions representing true positive rates and false positive rates are also maintained for the other categories to enable calibration of the quantity values for other categories. This calibration technique for calibrating a quantifier/categorizer is described in U.S. patent application entitled "A Method of, and System for, Classification Count Adjustment," filed by George H. Forman et al., on Mar. 14, 2005. In other embodiments, any other technique of calibrating a quantifier or adjusting its output quantification, especially by observing the behavior of its underlying categorizer(s), may also be used.

In yet another calibration technique, a score associated with each of a group of cases is obtained from the categorizer. A statistical distribution is computed based on the scores. The quantification measure is adjusted based on the statistical distribution.

The calibrated quantifier 126 is used to update (at 364) quantification measure(s) for each of the categories. The calibrated quantifier 126 produces calibrated quantification measure(s). The categorizer(s) 116 associated with the quantifier 126 provides information regarding the categorized cases to the quantifier 126 to enable the quantifier 126 to produce the quantification measure(s). Note that the quantification process can proceed concurrently with the search-and-confirm and the training processes discussed above. Thus, the analysis tool 16 may present running estimate(s) of the quantification measure(s) in each category. The running estimate is updated as the categorizer 116 is further trained or as new cases arrive. The quantifier 126 displays (at 366) the updated quantification measures, such as estimated number of cases and quantity estimates (columns 208 and 210 in the frame 204 of FIG. 4).

Steps 362-366 are created to continually update quantification measure(s) as more cases are received and the categorizer 116 is retrained.

Figure 5F:
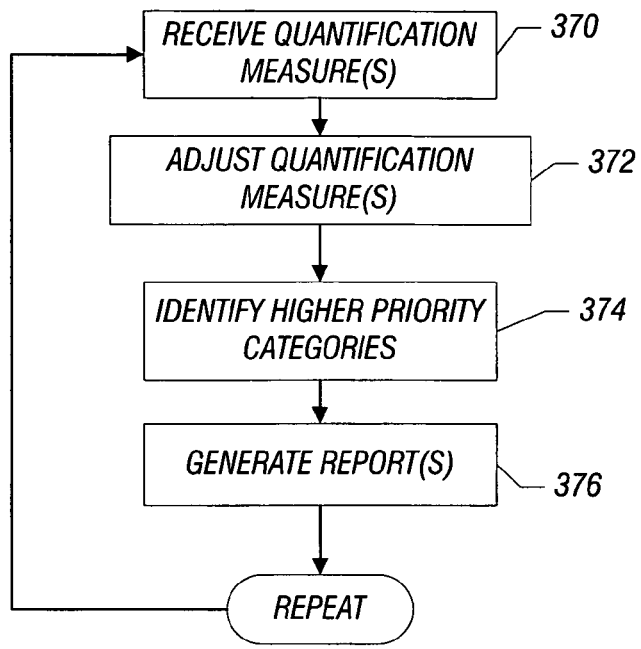

As shown in FIG. 5F, the ranking module 106 receives (at 370) the quantification measure(s) generated by the quantifier 126. Identification of higher priority categories can be based on the received quantification measure(s). For example, a category having a larger number of cases can be ranked higher than a category having a lower number of cases. Alternatively, a category associated with a higher aggregate number (e.g., hours spent resolving calls, estimated lost revenue, etc.) can be ranked higher than another category with a lower aggregate number.

Optionally, for more accurate ranking, the ranking module 106 also receives (at 372) adjusted quantification measure(s) (extrapolated or normalized quantification measure(s)) from the adjustment module 108. Extrapolation can be based on a simple trend, such as a trend detected over time. The extrapolated quantification measures represent quantification measure predicted for a future time period based on the detected trend. The adjusted quantification measure(s) can also include normalized quantification measure(s) based on factors such as sales numbers and trends, marketing promotions, seasonal buying patterns, product end-of-life information, product introduction information, and so forth. For example, a larger number of calls can result from a marketing promotion for a given time period. Thus, such larger number of calls should be normalized to factor out the increase in the number of calls due to increased sales volumes due to the marketing promotion.

A benefit of using adjusted quantification measure(s) for identifying higher priority categories is that categories that may appear currently to be major issues may not be major issues in the future or after normalizing the measure(s) to account for various factors.

Based on the actual quantification measure(s) from the quantifier 126 or the adjusted quantification measure(s) from the adjustment module 108, the ranking module 106 provides information to identify higher priority categories (at 374). As an example, the ranking module 106 can provide information identifying the top ten (or other number of) categories that represent problems that should be addressed (e.g., categories associated with highest quantification measures). Alternatively, the information presented by the ranking module 106 can be for categories associated with quantification measures that are greater than a predefined threshold. Alternatively, the presented information is for categories associated with highest quantification measures that when aggregated exceeds a predefined threshold (e.g., the quantification measures represent costs where aggregation of costs exceed a particular percentage, such as 80%, of the overall cost of all categories).

The ranking module 106 generates (at 376) a report (or multiple reports) 138 that lists the ranked categories. The report(s) 138 can be in graphical, textual, or in any format, as discussed above. The report(s) 138 can also be interactive report(s), such as in web page format, to enable a user to drill down to obtain various information relating to the issues identified in the report—e.g., quantification measure(s), information regarding sub-issues, detailed information regarding the issues, example cases, and so forth.

The quantification measures provided in the report(s) 138 are estimated measures that provide indications of magnitudes associated with various categories (e.g., magnitude of problems, etc.). Also, the presented quantification measures in the report(s) 138 can be predictions of what the quantification measures will be for the various categories in a future time period. The predicted quantification measures can be based on extrapolating observed quantification measures into the future, which can be based on linear regression fitting, as an example.

The content of a report can optionally be presented in a document containing information indicated by one or more of the following parameters: a selection criterion for categories to display; a desired depth to display in a hierarchy of problems; an ordering criterion used to rank categories; a category to focus on; a set of information related to a category to display; a selection of a presentation format; and a selection of a data set to use as the first data set. The document can be interactive to provide a user with the ability to dynamically alter one or more of the parameters. The document can be communicated to another computer or device over a computer network.

The report(s) generated by the ranking module 106 can also present information regarding a subset of cases within a category. For example, a report may be focused on a particular product model, a particular geographic region (e.g., state, country), demographic information of customers, incident dates, purchase dates, product introduction dates, and product manufacture dates. This enables a user of the analysis tool 16 to determine quantification measures and other information relating to the subset of cases. As an example, the user may realize that a particular model or geographic or user sophistication level has a relatively greater number or fewer instances of a particular problem, which information can point the way to a solution. The information can also be presented hierarchically. The user can also select the number of levels of the hierarchy to view.

Also, a user may select that the report contains information for multiple subsets of cases. The information (such as ranking information and quantification measures) can be provided in the report for the multiple subsets to enable comparison by a user of the relative magnitudes of the plural subsets of cases.

The report(s) generated can also show information that changes over time. For example, a graph for a current set of data can be overlaid or presented next to graphs produced for cases in earlier time periods. In fact, the output quantifier 126 produced by the analysis tool 16 can be used to process earlier data in other data sets for more accurate comparison with current data.

Steps 370-376 are repeated as more quantification measure(s) is(are) received.

Based on output provided by the ranking module 106, such as in the form of the report(s) generated at 376, an organization or user can take an action with respect to higher priority categories (such as to take action to fix a problem or to address some other issue). As shown in FIG. 5G, the organization or user obtains (at 390) the ranking information from the report(s) provided by the analysis tool 16. The ranking information is associated with quantification measures that provide indications of magnitudes of the various categories. Optionally, the quantification measures can be predicted quantification measures for a future time period.

For categories associated with quantification measures above some predefined threshold (e.g., number of calls greater than a predefined number, total amount of time to resolve the calls greater than a predefined time, total amount of lost revenue greater than a predefined amount, and so forth), the organization or user obtains (at 392) computations of the following: (1) the estimated cost (related to labor costs associated with the amount of time involved in addressing the category, parts cost, etc.) to address the issue associated with each of such categories; and (2) the expected benefit of taking an action (e.g., cost savings, increased revenue, etc.). The computations can be calculated manually or in an automated fashion using a module of the analysis tool 16 or by some other software module.

Next, the organization or user obtains (at 394) computations of the expected return-on-investment (ROI) for addressing each of the categories. To calculate the expected ROI, expected cost information relating to an action taken with respect to a category is received. Cost information includes any or some combination of the following: labor cost to implement a product fix; material cost to implement the product fix; labor cost related to time spent creating documentation; and so forth. The expected ROI is computed based on a value (e.g., monetary value), such as cost savings, increased revenue, increased customer satisfaction, or some other benefit, that can be expected from addressing the issue associated with the category.

The expected improvement in customer satisfaction results from taking an action with respect to a particular category. For example, customer satisfaction can be improved if call agents responding to customer complaints or inquiries can answer such complaints or inquiries more quickly. Other types of actions can also improve customer satisfaction, such as adding equipment to improve access times or availability of servers (e.g., web servers), providing documentation to allow customers to more easily use a product, and so forth.

Next, the organization or user causes (at 396) the categories to be ordered (in a list) according to either expected ROI. The organization or user then takes action (at 398) based on the ordered list to address issues associated with one or more of the categories. The categories for which the organization or user takes action can be based on the overall budget available to the organization or user. The organization or user can choose to ignore categories that are too small to justify expending resources to address.

Examples of actions that can be taken with respect to a category include one or more of: allocating a sum of money (or otherwise defining a budget); allocating a physical resource (e.g., equipment); hiring a person; assigning a task to a person; writing a document (such as a help document); modifying an existing document; identifying a document; altering availability of a document (such as to make the document more widely available such as posting the document on a web site); altering an organization of a web site; modifying a design of a product; modifying a packaging of a product; modifying a manufacturing process for a product; creating a software program; modifying a software program; creating a patch for a software program; contacting a customer, vendor, supplier, employee, or partner; modifying a marketing campaign; changing response time of service providers; training service personnel; discontinuing efforts that are no longer required; changing the process of writing and delivery of software programs; taking actions with reference to seasonal fluctuations; provide reports to customers regarding how issues are being monitored and addressed; and other actions.

Taking an action with respect to a given category can be based on single-factor or multi-factor input variable analysis to determine a most effective issue resolution path. A single-factor input variable analysis refers to an analysis that takes into account a single input variable (e.g., defective hard disk drives). A multi-factor input variable analysis refers to an analysis that takes into account multiple input variables (e.g., defective hard disk drives and an inability to boot). In some cases, several factors (or categories) can be related. In the above example, customers with defective hard disk drives are usually unable to boot. Consequently, by performing multi-factor input variable analysis, it can be determined that solving the hard disk drive problem will also solve the inability to boot problem. In this manner, the expected ROI would be higher since multiple categories can be addressed by one action.

Figure 5H:
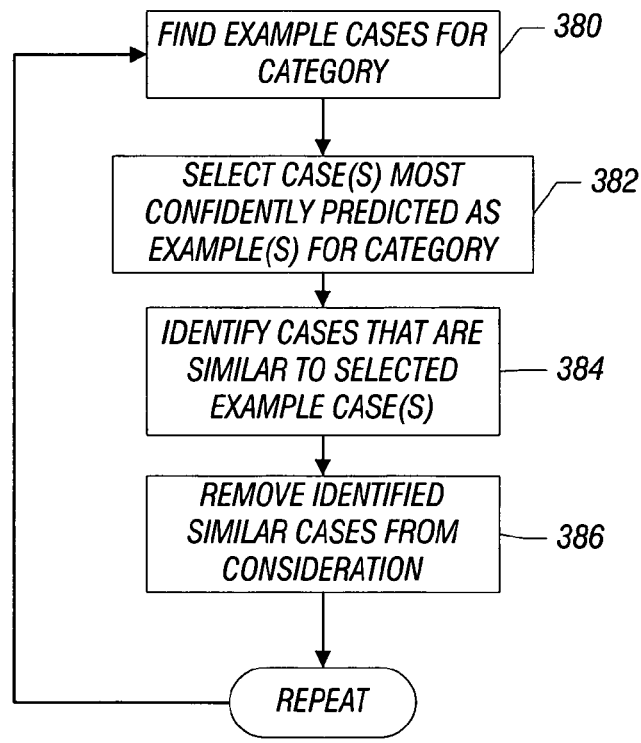
Figure 5G:
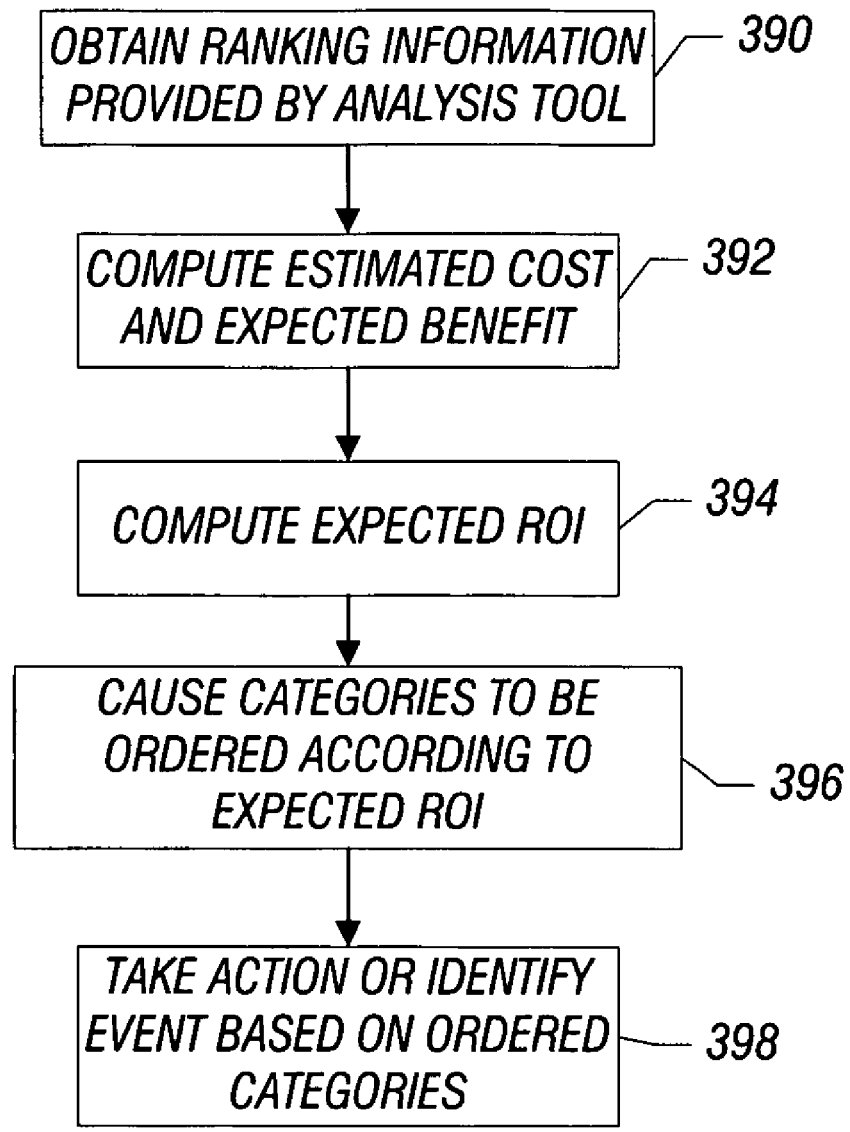

As shown in FIG. 5H, the example case identifier 104 (FIG. 2) is optionally invoked to identify (at 380) example cases for the listed categories provided by the ranking module 106. The example case identifier 104 selects (at 382) a case or cases that are most confidently predicted to be representative of a category based on one or more factors. The example case identifier 104 can also identify (at 384) cases that are similar to the selected example case, such that the similar cases are not also provided as examples (to reduce redundancy). The similar cases can then be removed (at 386) from consideration in finding other example cases. The other example cases for a category are selected based on dissimilarity with previously selected example cases, so that a user is presented with a number of dissimilar example cases for better understanding of a particular category. When a desired number of example cases have been identified, the example case identifier 104 repeats steps 380-386 for another category.

As noted above, the example case identifier 104 can also alternatively use a clustering algorithm for finding example cases for different clusters of a category.

The quantifier 126 and ranking module 106 can be used off-line (on the analysis server 14 separate from the analysis tool 16 or on another computer) for application to other data sets. For use off-line, the created quantifier 126, as calibrated, along with associated categorizer(s) 116, and the ranking module 106 are packaged into a separate software tool that can be invoked on the computer 100 or another computer.

As the quantifier 126 in the separate software tool is used with new data sets, the estimated quantification measure(s) made by the quantifier 126 on the new data sets, along with categorizations provided by the categorizer(s) 116, can be provided to an expert or other user. The expert or other user can then decide whether further calibration of the quantifier 126 and/or training of the categorizer(s) 116 associated with the quantifier 126 should be performed.

The categorizer(s) 116 associated with the quantifier 126 is also able to produce confidence indications that are output for the new data sets. As an example, the categorizer(s) 116 is able to report the number of cases for which the categorizer(s) 116 has a low level of confidence. As the number of low-confidence cases grow, then the categorizer(s) 116 is retrained since the hierarchy 124 of categories may no longer be sufficient. The analysis tool 16 can then again be used in an interactive fashion with a user to retrain the categorizer(s) 116 and either create a new quantifier or modify the existing quantifier.

Instructions of the various software modules described above are loaded for execution on corresponding processors. The processors include microprocessors, microcontrollers, processor modules or subsystems (including one or more microprocessors or microcontrollers, or other control or computing devices. As used here, a "controller" refers to hardware, software, or a combination thereof. A "controller" can refer to a single component or to plural components (whether software or hardware).

Data and instructions (of the software) are stored in respective storage devices, which are implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method comprising:
   training a categorizer for plural categories using a machine-learning algorithm;
   classifying, by the categorizer, a set of cases into the plural categories;
   computing one or more quantification measures regarding cases in the set of cases based on output from the categorizer;
   providing information to enable ranking of the categories based on the one or more quantification measures; and
   effecting action to address an issue associated with at least one of the categories based on the provided information,
   wherein at least the classifying, computing, and providing are performed by software stored on one or more machine-readable media and executed by at least one processor.

2. The method of claim 1, wherein the set of cases comprises a first set of cases, wherein training the categorizer comprises:
   identifying cases from a second set of cases based on a query;
   receiving confirmation or disconfirmation as to whether cases from the identified cases are examples of a particular one of the categories;
   identifying training cases for the particular one of the categories based on the confirmation or disconfirmation, the training cases for training the categorizer.

3. The method of claim 2, wherein identifying the plural categories comprises running a clustering algorithm on cases from the second set of cases.

4. The method of claim 1, wherein classifying the cases into plural categories comprises classifying the cases for plural problems encountered by customers.

5. The method of claim 1, wherein the set of cases comprises a first set of cases, and wherein training the categorizer is based on a second set of cases, the method further comprising receiving the second set of cases based on receiving data by one or more of: recording the data by support personnel; generating a transcript of a telephone conversation; recording a telephone conversation: receiving an e-mail message; providing a record of pages visited on a web site; providing an output from a diagnostic program; storing the data in a database; receiving a computer file from a customer; receiving the data from a survey; and receiving the data by a monitoring device.

6. The method of claim 5, wherein recording the data by support personnel comprises one or more of recording a description of an interaction between the support personnel and a customer; recording selection of a category by the support personnel; and recording an indication of a state of mind of a customer.

7. The method of claim 5, wherein providing a record of the pages visited by a web site comprises one or more of recording a document viewed by a customer and recording a document viewed by support personnel.

8. The method of claim 5, wherein storing the data in the database comprises one or more of storing information relating to a prior call; storing information relating a purchase; and storing demographic information relating to a customer.

9. The method of claim 1, wherein training the categorizer using the machine-learning algorithm comprises training the categorizer using one of a support vector machine learning algorithm; naïve Bayes network learning algorithm; a Bayesian network learning algorithm; a neural network learning algorithm; and a decision tree learning algorithm.

10. The method of claim 1, wherein computing the one or more quantification measures comprises computing one or more of: sum of duration of calls represented by the cases; an amount of money to resolve the cases; amount of time to resolve the cases; amount of lost revenue due to the cases; a degree of customer aggravation; an amount of time spent by customers before initiating a call; an amount of time spent by customers during the call; an amount of time spent diagnosing cases; amount of money spent by customers; an amount of money spent interacting with customers; an amount of money spent diagnosing the cases; and a number of customers who declined to initiate a call.

11. The method of claim 1, wherein providing the information comprises providing information ranking the categories according to at least one or more of: number of cases in the categories; amount of time involved in resolving cases in the categories; amount of money spent to resolve cases in the categories; amount indicating customer dissatisfaction due to the cases in the categories; amount of lost revenue due to the cases in the categories; and amount indicating lost customers due to the cases in the categories.

12. The method of claim 1, further comprising ranking the categories based on the provided information.

13. The method of claim 12, further comprising producing a report to provide information regarding the ranked categories, wherein producing the report comprises producing a report containing user-selectable fields to obtain further information regarding at least one of: details regarding the ranked categories, and subcategories of the ranked categories.

14. The method of claim 13, wherein producing the report comprises producing an interactive document to allow a user to change one or more criteria regarding ranking of the categories.

15. The method of claim 1, wherein the categories are part of a hierarchy of categories, the method further comprising receiving user input to add one or more additional categories to the hierarchy.

16. The method of claim 1, further comprising employing a clustering algorithm to cluster cases to identify example cases for the categories.

17. The method of claim 1, further comprising adjusting the one or more quantification measures based on one or more factors, wherein providing information to rank the categories is based on the adjusted one or more quantification measures.

18. The method of claim 17, wherein adjusting the one or more quantification measures is based on information about the categorizer, the information comprising one of (1) a quality measure relating to the performance of the categorizer in classifying training cases for a particular category; and (2) a statistical distribution of scores computed by the categorizer for classifying training cases for the particular problem.

19. The method of claim 17, wherein adjusting the one or more quantification measures comprises extrapolating the one or more quantification measures for a future time period.

20. The method of claim 17, wherein adjusting the one or more quantification measures comprises normalizing the one or more quantification measures based on the one or more factors.

21. The method of claim 20, wherein normalizing the one or more quantification measures is based on at least one of sales numbers and trends, marketing promotions, seasonal buying patterns, product end-of-life information, and product introduction information.

22. A method comprising:
training a categorizer for plural problems associated with a customer support organization based on a machine-learning algorithm;
classifying, by the categorize, incidents in a first data set into the plural problems;
computing one or more quantification measures regarding the plural problems based on output from the categorizer; and
presenting information relating to relative magnitude of the problems based on the one or more quantification measures; and
taking action in the customer support organization to remedy at least one of the problems based on the presented information,
wherein at least the classifying, computing, and presenting are performed by software stored on one or more machine-readable media and executed by at least one processor.

23. The method of claim 22, wherein presenting the information comprises presenting information of at least one of the following problems: (1) a predefined number of problems associated with highest quantification measures; (2) problems associated with highest quantification measures that when aggregated exceeds a predefined threshold; and (3) problems associated with quantification measures exceeding a predefined threshold.

24. The method of claim 22, wherein presenting the information comprises presenting information to identify higher priority problems in a predetermined frame of reference.

25. The method of claim 24, wherein presenting the information to identify the higher priority problems in the predetermined frame of reference comprises presenting the information to identify the higher priority problems in at least one of a predetermined time period, a product line, and a geographic region.

26. The method of claim 22, further comprising receiving information associated with the incidents in the first data set from one or more call agent stations.

27. The method of claim 22, wherein computing the one or more quantification measures is performed by a quantifier, the method further comprising computing one or more other quantification measures, by the quantifier, associated with incidents in a second data set based on output from the categorizer; and
presenting information to identify higher priority problems for the second data set based on the one or more other quantification measures for the second data set.

28. The method of claim 27, further comprising displaying outputs regarding the information identifying higher priority problems for the first data set and the information identifying higher priority problems for the second data set to enable comparison of the outputs.

29. The method of claim 28, wherein the first and second data sets correspond to different time periods, and wherein displaying the outputs comprises displaying outputs regarding information identifying higher priority problems for data sets of different time periods.

30. The method of claim 22, wherein presenting the information comprises producing a document containing information indicated by one or more of the following parameters: a selection criterion for problems to display; a desired depth to display in a hierarchy of problems; an ordering criterion used to rank problems; a problem to focus on; a set of information related to a problem to display; a selection of a presentation format; and a selection of a data set to use as the first data set.

31. The method of claim 30, wherein producing the document comprises producing an interactive document providing a user with an ability to dynamically alter on or more of the parameters.

32. The method of claim 30, wherein presenting the information comprises producing a report containing information associated with a subset of the first data set, the subset based on one or more of a particular product, a geographic region, demographic information of customers, date of incidents, purchase date, production introduction date, and product manufacture date.

33. The method of claim 22, wherein taking the action comprises one or more of: allocating a sum of money; defining a budget; allocating a physical resource; hiring a person; assigning a task to a person; writing a document; modifying an existing document; identifying a document; altering availability of a document; altering an organization of a web site; modifying a design of a product; modifying a packaging of a product; modifying a manufacturing process for a product; creating a software program; modifying a software program; creating a patch for a software program; contacting a customer, vendor, supplier, employee, or partner; modifying a marketing campaign; changing response time of service providers; training service personnel; discontinuing efforts that are no longer required; changing the process of writing and delivery of software programs; taking actions with reference to seasonal fluctuations; and providing reports to customers regarding how issues are being monitored and addressed.

34. The method of claim 22, further comprising repeating the classifying, computing, presenting, and taking action as additional incidents are received.

35. The method of claim 22, further comprising:
inspecting classifications of a subset of the incidents in the first data set performed by the categorizer;
computing a measure of classifications determined to be either incorrect or for which the categorizer is insufficiently confident about; and
retraining the categorizer in response to the measure exceeding a predefined threshold.

36. A machine-readable storage medium containing instructions that upon execution by at least one processor cause a system to:
receive queries relating to respective plural customer support issues;
identify cases from a data set in response to the queries;
receive first indications that a first portion of the identified cases belong to the customer support issues, and second indications that a second portion of the identified cases do not belong to the customer support issues;
train a categorizer for the plural customer support issues based on the received first and second indications;
classify, by the categorizer, cases in a data set into the plural customer support issues;
quantify the cases in the data set based on the classifying by the categorizer; and
produce information to enable ranking of the customer support issues based on the quantifying.

37. A system comprising:
a storage to store a data set having plural cases;
a categorizer;
a search engine to identify cases from the data set in response to queries relating to plural customer support issues;
an interface to receive indications of whether the identified cases belong to the plural customer support issues;
a training module to train the categorizer based on the received indications, wherein the categorizer is adapted to classify the cases into the plural customer support issues;
a quantifier to compute one or more quantification measures for the cases in the plural customer support issues based on output from the categorizer; and
a ranking module to provide information to prioritize the customer support issues based on the one or more quantification measures.

38. The system of claim 37, further comprising an adjustment module to adjust the one or more quantification measures, the ranking module to provide information to prioritize the customer support issues based on adjusted one or more quantification measures.

39. The system of claim 38, the adjustment module to adjust the one or more quantification measures by performing one of:
extrapolating the one or more quantification measures for a future time period; and
normalizing the one or more quantification measures based on one or more factors.

40. An article comprising a machine-readable storage medium containing instructions that upon execution by at least one processor cause a system to:
receive queries relating to respective plural problems;
identify incidents from a first data set in response to the queries;
receive indications regarding whether the identified incidents belong to the problems;
train a categorizer for the plural problems based on the received indications;
classify, by the categorizer, incidents from a second data set into the plural problems;
compute one or more quantification measures for the incidents for the plural problems based on output from the categorizer; and
present information to prioritize the problems based on the one or more quantification measures; and
effect action to address at least one of the problems based on the information prioritizing the problems.

41. The method of claim 1, wherein the training, classifying, computing, and providing are performed by the at least one processor in a customer support system.

42. The method of claim 1, wherein the training, classifying, computing, and providing are performed by a call agent system that includes call agent stations and at least one analysis server.

43. The method of claim 2, wherein identifying the training cases comprises adding at least one of the training cases to a positive training set in response to a confirmation and at least another of the training cases to a negative training set in response to a disconfirmation,
wherein the categorizer is trained using the positive and negative training sets.

44. The method of claim 22, wherein the training, classifying, computing, and presenting are performed by the at least one processor in a customer support system.

45. The machine-readable storage medium of claim 36, wherein the instructions when executed cause the system to add the first portion of the identified cases to a positive training set and the second portion of the identified cases to a negative training set, wherein the categorizer is trained based on the positive and negative training sets.

* * * * *

UNITED STATES PATENT AND TRADEMARK OFFICE
CERTIFICATE OF CORRECTION

PATENT NO.         : 7,593,904 B1                                                          Page 1 of 1
APPLICATION NO. : 11/172187
DATED              : September 22, 2009
INVENTOR(S)        : Evan R. Kirshenbaum et al.

It is certified that error appears in the above-identified patent and that said Letters Patent is hereby corrected as shown below:

In column 22, line 30, in Claim 5, delete "conversation:" and insert -- conversation; --, therefor.

In column 23, line 57, in Claim 22, delete "categorize," and insert -- categorizer, --, therefor.

In column 24, line 54, in Claim 31, delete "on" and insert -- one --, therefor.

Signed and Sealed this

Seventh Day of September, 2010

David J. Kappos
*Director of the United States Patent and Trademark Office*